United States Patent
Romell

Patent Number: 6,152,973
Date of Patent: Nov. 28, 2000

[54] COMPRESSED WOOD FUEL PELLET AND METHOD AND MACHINE FOR MAKING SAME

[75] Inventor: Dag Romell, Ithaca, N.Y.

[73] Assignee: Innovation Investment Consultants AB, Nykoping, Sweden

[21] Appl. No.: 08/140,142

[22] PCT Filed: May 4, 1992

[86] PCT No.: PCT/SE92/00287

§ 371 Date: Nov. 3, 1993

§ 102(e) Date: Nov. 3, 1993

[87] PCT Pub. No.: WO92/19702

PCT Pub. Date: Nov. 12, 1992

[30] Foreign Application Priority Data

May 3, 1991 [SE] Sweden ................................. 9101334

[51] Int. Cl.$^7$ .............................. C10L 5/44; B30B 9/28; B27H 1/02

[52] U.S. Cl. ................................. 44/590; 44/530; 44/596; 44/629; 44/634; 144/3.1; 144/162.1; 144/193.1; 144/361; 144/364; 144/366

[58] Field of Search .............................. 44/590, 634, 629, 44/596, 530; 144/162 R, 193 R, 366, 3 R, 361, 364

[56] References Cited

U.S. PATENT DOCUMENTS

| | | |
|---|---|---|
| 660,863 | 10/1900 | Low ........................................... 44/606 |
| 959,870 | 5/1910 | McCan . |
| 1,542,576 | 6/1925 | Pfleumer ................................... 144/380 |
| 2,666,463 | 1/1954 | Heritage .................................... 144/361 |
| 2,876,811 | 3/1959 | Matthews ............................. 144/162 R |
| 3,084,620 | 4/1963 | Gibbons ...................................... 44/634 |
| 3,304,970 | 2/1967 | Altoosaar ............................... 144/162 R |
| 3,527,580 | 9/1970 | Bonlie . |
| 4,060,396 | 11/1977 | Burton ........................................ 44/590 |
| 4,818,249 | 4/1989 | Barrett, Jr. . |
| 4,834,777 | 5/1989 | Endebrock . |
| 5,190,088 | 3/1993 | Thomassen et al. ..................... 144/361 |

FOREIGN PATENT DOCUMENTS

| | | |
|---|---|---|
| 1190744 | 7/1985 | Canada . |
| WO 9102637 | 3/1991 | WIPO . |

*Primary Examiner*—Margaret Medley
*Attorney, Agent, or Firm*—Jones, Tullar & Cooper, P.C.

[57] ABSTRACT

A method and machine for making a new and improved compressed wood fuel pellet. The method comprising the steps of severing a wafer of tree trunk or branch, punching or splitting a small portion along the grain in the wafer, confining each portion across the grain, and then compressing each portion along the grain to form a compressed wood fuel pellet of contiguous wood having a specific gravity of about 1.2–1.4 with a very high efficiency process and machine.

19 Claims, 3 Drawing Sheets

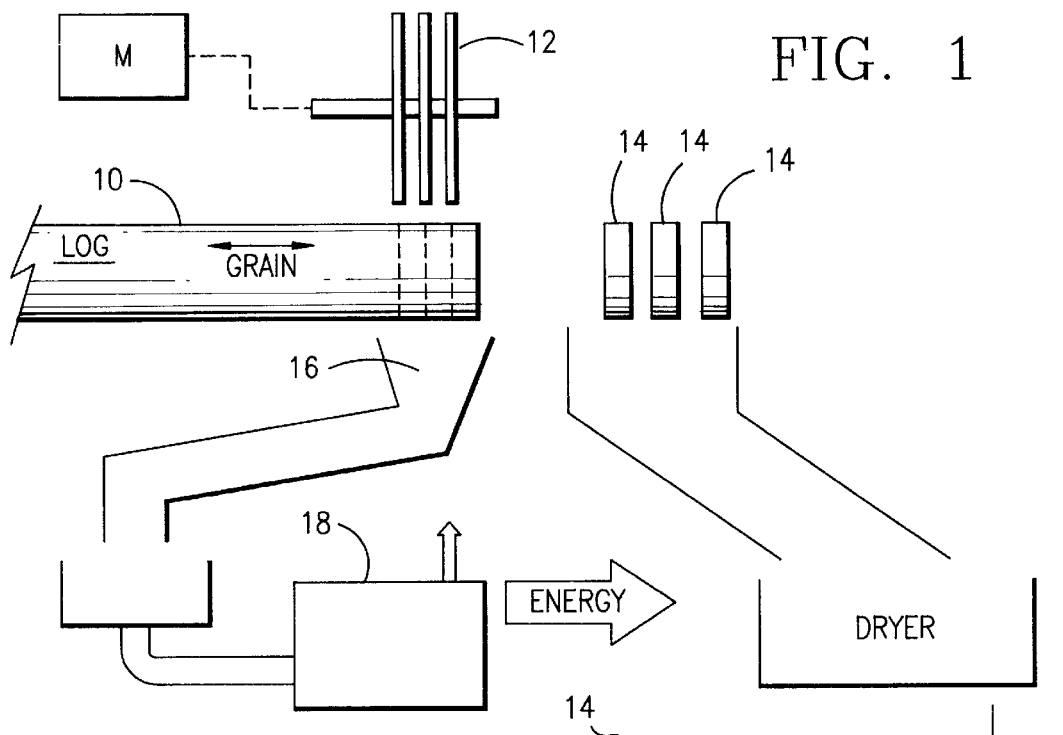
FIG. 1
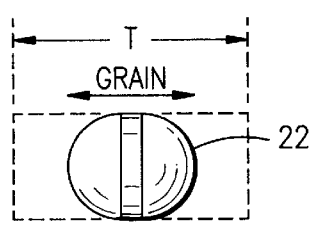
FIG. 3
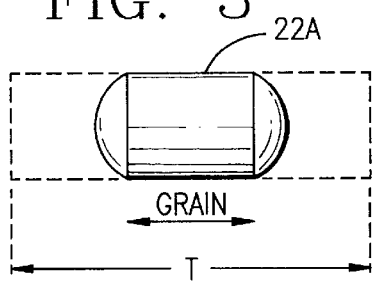
FIG. 4
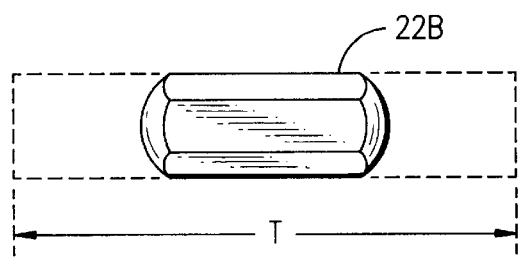
FIG. 6
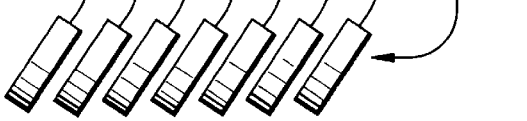
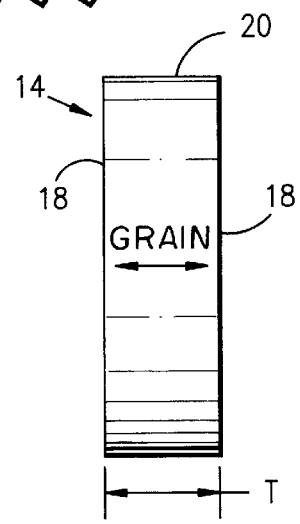
FIG. 5
FIG. 2
FIG. 7

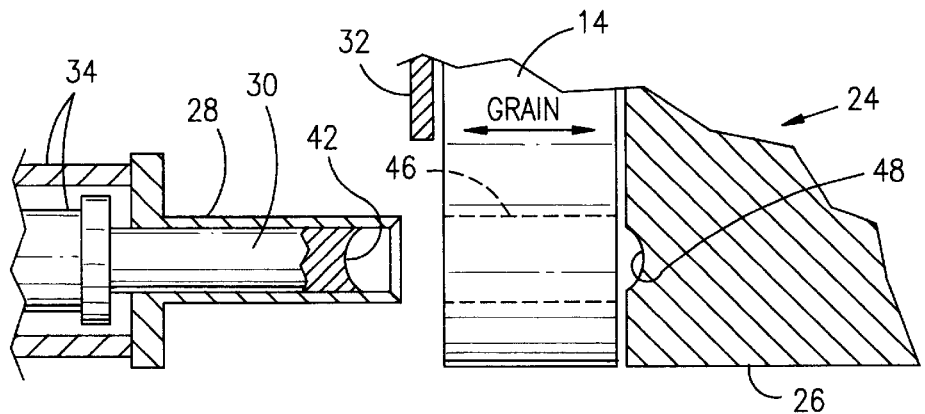
FIG. 8
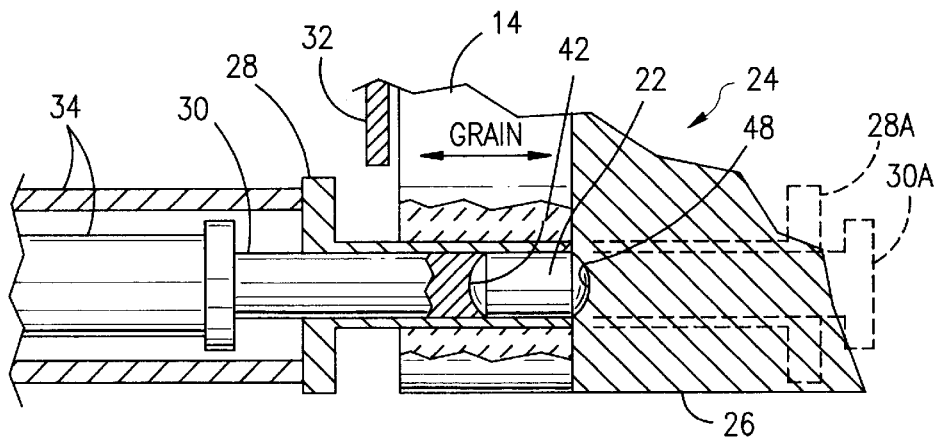
FIG. 9
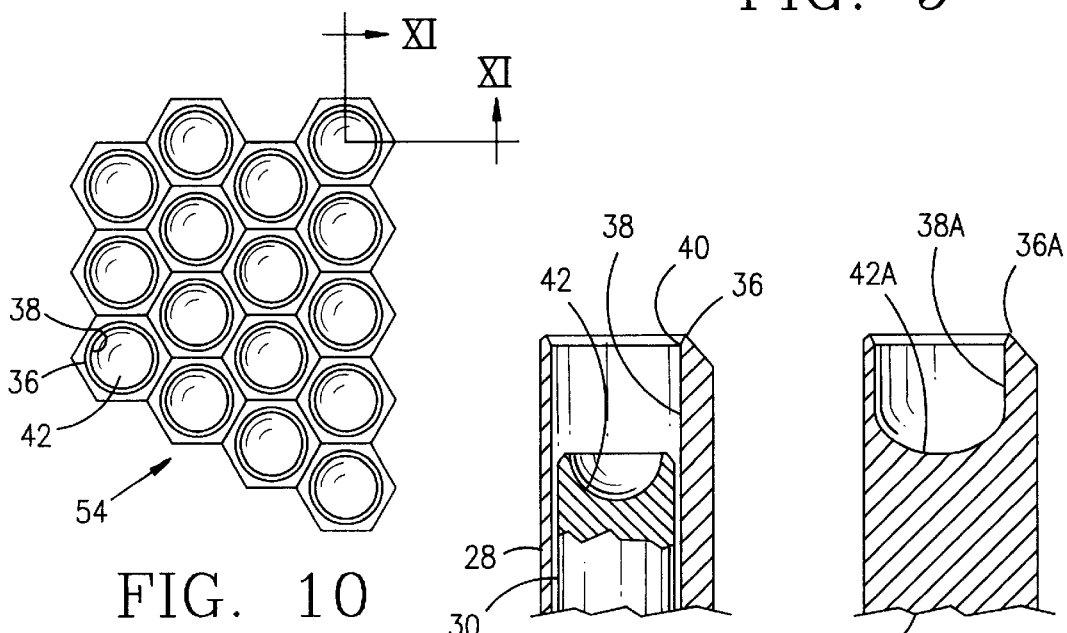
FIG. 10
FIG. 11
FIG. 12

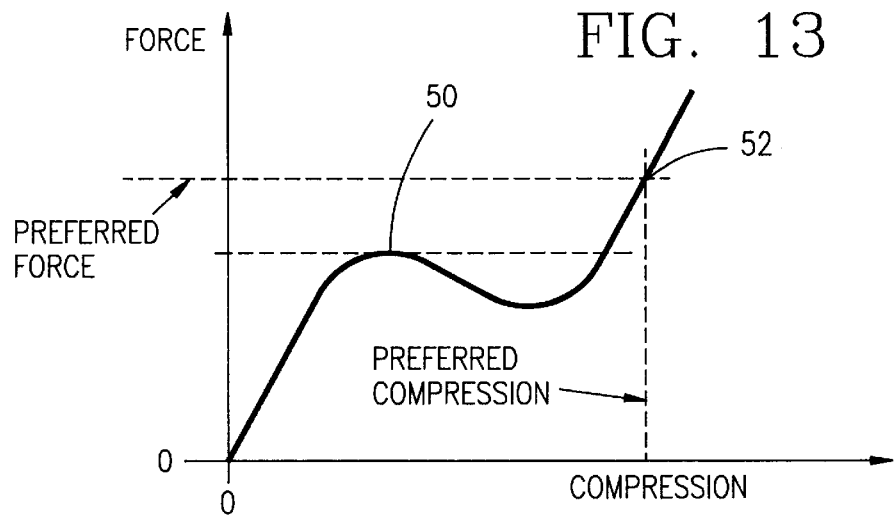
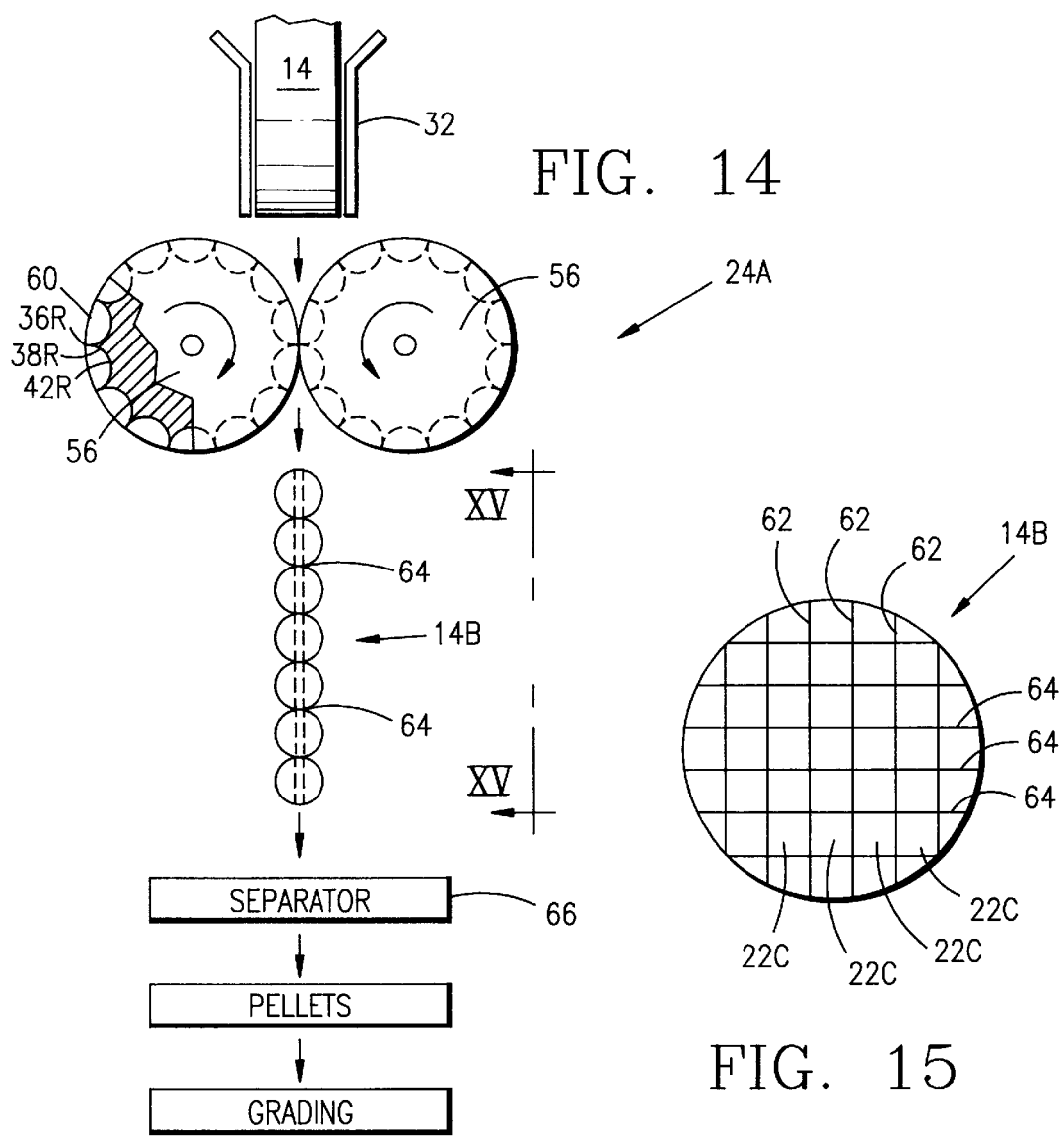

COMPRESSED WOOD FUEL PELLET AND METHOD AND MACHINE FOR MAKING SAME

This application is a 371 of PCT/SE92/00287 filed on May 4, 1992.

FIELD OF THE INVENTION

This invention pertains to a compressed fuel pellet made of wood, to a method of making compressed wood fuel pellets, and to a machine for making compressed wood fuel pellets.

THE PRIOR ART

Known prior art includes the following:

U.S. Pat. No. 959,870
U.S. Pat. No. 1,542,576
U.S. Pat. No. 2,586,308
U.S. Pat. No. 3,132,674
U.S. Pat. No. 3,527,580
U.S. Pat. No. 3,938,965
U.S. Pat. No. 4,015,951
U.S. Pat. No. 4,017,980
U.S. Pat. No. 4,060,396
U.S. Pat. No. 4,834,777
DT 2 700 156
DE C 516 801
WO 91/02637
FR 79/15755

Of particular relevance from these are the following:

U.S. Pat. No. 959,870 teaches a fuel briquet of relatively large size, as an example, a log, made of wood shavings and bound together with an agent, pitch, or resin.

U.S. Pat. No. 1,542,526 diametrically compresses a wood piece and impregnates the compressed wood to make buttons, machine parts and the like, before the availability of plastics.

U.S. Pat. No. 2,586,308 diametrically compresses wood shuttle blocks for fabric looms.

U.S. Pat. No. 3,132,674 compresses and steams an elongate wooden rod to make a high-strength shovel handle. Compression in the area of 5½% is attained, and electrical switching is utilized to control compression.

In all known examples of prior art the wooden fuel pellets are being made from sawdust, shavings, chips and other particulated wood.

Current wood fuel pellets fall apart more or less easily upon handling, whether in transport from source to consumer or in stokers etc. Typically, it has been found that pellets available on the market after such handling may contain no more than ¾ or even ⅔ of pieces that may still be called pellets, while the remainder consists of small particles and dust.

Current wood fuel pellets are all of different size and have shapes that allow them to form bridges in hoppers and the like.

These two disadvantages make stokers and the like more expensive, having to rely on augers or similar means to feed the pellets into the firebox, while the new pellets can be gravity fed.

Pellet manufacturing plants in and for the prior art are usually large and expensive installations serving large areas, which means that transport costs, both for the raw material and for the finished product become a significant fraction of the price charged to the consumer.

Making pellets such as are currently available reportedly used about 15% of the energy of the wood in the process.

Dies used in producing pellets as currently made wear out quickly, due to a combination of very high pressure and friction and the fact that the particulate to be compressed often contains a certain amount of grains of sand. They are also expensive to replace.

OBJECTS OF THE INVENTION

It is an object of the invention to provide a new method and new machine for making a new and improved compressed wood fuel pellet.

It is a further object of this invention to provide a new and improved method of making compressed wood fuel pellets without particulising the wood.

It is a further object of this invention to provide a new and improved machine for making compressed wood fuel pellets from solid wood.

It is yet another object of the invention to provide a new improved compressed wood fuel pellet made from solid wood.

SUMMARY OF THE INVENTION

A method of making compressed wood fuel pellets has the steps of severing a wafer off of a log, confining a portion of the wafer perpendicular to the grain, and compressing the confined portion along the grain of the wood.

A machine for making compressed wood fuel pellets has a circumferential splitting edge, a cage surface rearward of the edge, and a hammer surface behind the cage to compress a split wafer portion along the grain of the wood.

An improved compressed wood fuel pellet made out of a severed wafer section has contiguous wood fiber and compression of at least 40% along the grain to a specific gravity of at least 1.2.

BRIEF DESCRIPTION OF THE DRAWINGS

FIG. 1 is a schematic of a method and apparatus for making the wood wafer to be used as the raw material for wood fuel pellets;

FIG. 2 is a side elevational view of a typical wood wafer;

FIG. 3 is a side elevational view of a first preferred embodiment of a wood fuel pellet;

FIG. 4 is a side elevational view of a second preferred embodiment of a wood fuel pellet;

FIG. 5 is an end elevational view of the wood pellet of either FIG. 3 or FIG. 4;

FIG. 6 is a side elevational view of a third preferred embodiment of a wood fuel pellet;

FIG. 7 is an end elevational view of the pellet of FIG. 6;

FIG. 8 is a side elevational view of a first machine for making the fuel pellets;

FIG. 9 is a side elevational view of the machine of FIG. 8, making a pellet;

FIG. 10 is an end elevational view of the machine of FIG. 8 in a plural configuration;

FIG. 11 is a section through lines XI—XI of FIG. 10;

FIG. 12 is an alternative section through lines XI—XI;

FIG. 13 is a force vs. compression graph for making the pellets of this invention;

FIG. 14 is a schematic view of an alternative machine for making the pellets of this invention;

FIG. 15 is a plan view of the compressed wafer in FIG. 14.

DESCRIPTION OF THE PREFERRED EMBODIMENT

In accordance with the principles of this invention, an elongate leg 10 of wood is provided, preferably in a form that is at least partially dried. A severing machine 12, a gang saw being shown, is disposed to sever individual discrete wood wafers 14 (or slabs) off of the log 10. Dust from the severing operation is captured by a collector 16 and recycled in heat engine 18 to provide energy for the facility and the operation of the machinery. The severed wafers 14 are preferably dried to a moisture content less than the log 10 and then inventoried for subsequent use.

The wafer 14 as shown in FIG. 2 has been cut from a log 10 that will have a preferred diameter up to 250 mm. The wafer 14 has been cut off so that the opposing surface faces 18 are parallel to each other and perpendicular to the grain of the wood. The thickness (T) of the wafer will vary according to the particular type of wood and size of pellet, but will typically be in the range of 20 mm to 50 mm thick. The wafer 14 will have a diametric surface that preferably has a diameter of 250 mm or less. The wafer 14 is then dried to a preferred moisture content of 20±5%. Each wafer 14 is a contiguous piece of wood which is in virgin state and has not been compressed.

The pellets 22, 22A, 22B shown in FIGS. 3–7 are made from the wafers 14. The pellets 22, 22A, 22B are relatively small and many are made from each wafer 14. A typical preferred size for a pellet 22, 22A, 22B is about 12–20 mm in diameter across the wood grain and a length of 1–2.5 times the diameter along the grain. The pellets 22, 22A, 22B are sized and shaped so that they can easily and reliably be packaged, distributed, and handled in automatic feeding wood pellet burners.

In FIG. 8 and FIG. 9, the machine 24 for making the pellets 22, 22A, 22B from the wafers 14, is shown with an anvil 26, a tubular pellet punch 28, a pellet hammer 30, and a wafer guide 32. The punch 28 and hammer 30 are operatively connected to a mechanical drive mechanism 34, capable of pushing the punch 28 through the wafer 14.

FIG. 11 shows the punch 28 to have a circumferential wafer splitting edge 36, an internal circumferential cage surface 38 which is rearward of the edge 36, and a rounded corner 40 that fairs the edge 36 to the cage surface 38. Inside and at the back of the cage surface 38, is a hammer surface 42 which is preferably concave.

FIG. 12 shows an alternative structure wherein the splitting edge 36A, cage surface 38A, and hammer surface 42A are incorporated in a single piece of structure 44, that consolidates the functions of the punch 28 and the hammer 30.

In operation of the machine 24, and in the making of the pellets 22, 22A, 22B, the entire wood wafer 14 is fed into the punch 28 and hammer 30 and anvil 26 by the wafer guide 32. The punch 28 is driven into and through the wafer 14 with the grain of the wafer 14, to punch or split out a wafer portion 46 that remains in the wafer 14 and which has a length along the grain which is initially equal to the thickness (T) of the wafer 14. The portion 46 is backed up by the anvil 26 and preferably by a concave anvil pocket 48. The hammer 30 is then pushed inward and against the split portion 46 as is shown in FIG. 9. The hammer surface 42 is pushed toward the anvil surface 48 and the wafer portion 46 is radially confined across its grain by the cage surface 38 as the hammer surface 42 and anvil surface 48 compress the wafer portion 46 along the grain to form the compressed pellet 22, 22A, 22B.

The force vs. compression curves are shown in FIG. 13 wherein a force in excess of a "knee value" 50 must be applied to begin compression, whereupon the wood compresses through a "Z-curve" into an area of relative solidness. When compression reaches a point where the compressive force is between 2 and 3 times the "knee value" 50 the pellet 22, 22A, 22B is fully compressed. The force and compression vary from wood to wood. A soft wood like pine will typically require from 5,000 to 6,000N/cm$^2$ at the "knee value" point and compress to about ½ its original length. Soft hardwood such as aspen and birch will typically require from 4,000 to 6,000N/cm$^2$ and compress to about 45% of original length. Very hard wood such as oak requires more pressure and exhibits less compression. Regardless, the finished pellet has a specific gravity in the range of 1.2 to 1.4. The various compression factors are accomodated by severing thicker or thinner wafers 14 in order to produce a consistent length of pellet 22, 22A, 22B regardless of the type of wood being used. In a relatively short pellet 22, the single piece punch and hammer 44 is an effective alternative.

FIG. 9 illustrates in dotted line how a second and opposed punch 28A and hammer 30A are provided to split from the wafer and compress the pellet 22 from both ends, i.e. both sides of the wafer 14.

FIG. 10 shows how a plurality of punch and die structure can be nested together into a hex-cellular grid 54 of multiple units that can do a plurality of pellets 22, 22A, 22B at one time from a wafer 14. The grid 54 can be sized to do a fraction of the wafer 14 or all of the wafer 14 in a single cycle. The entire process of punching or splitting, confining, and compression is done in a single cycle of operation.

FIG. 14 shows an alternative pellet making machine 24A having a wafer guide 32 that feeds the entire wafer 14 into a pair of rollers 56. At least one and preferably both rollers 56 have radial pockets 58 that duplicate the structure and function of the single piece punch and hammer 44. Specifically, each pocket 58 has its own splitting edge 36R, cage surface 38R, and hammer surface 42R. Each roller 56 has a length which is greater than the diameter of the wafer 14, and a plurality of knives or splitters 60. When the wafer 14 is fed into the rollers 56, the pockets 58 compress the wafer 14 along the grain into what looks like a line of beads, as designated by 14B, and the splitters 60 slice or crease the wafer 14B with creases 62 that are perpendicular to the compressions 64 shown in FIG. 14. The wafer 14B comes out of the rollers 56 in one piece and is then placed into a separator 66 wherein the wafer 14B is tumbled to break it into pieces whereupon the wafer 14B breaks completely up into a plurality of pellets 22C. Pieces smaller than the pellets may be graded into an alternative product or recycled as fuel.

These new pellets 22, 22A, 22B, 22C are preferably made by small scale machines 24, 24A using locally available wood and catering to local customers, thus reducing distribution costs significantly. These new pellets 22, 22A, 22B, 22C require less than 4% energy invested for manufacture, which is about ¼ of the energy used in manufacturing prior art pellets. The dies to make these new pellets 22, 22A, 22B, 22C are not subjected to the high pressure and friction of prior art tooling, and therefore last longer. This new pellet 22 and method is a total departure from the prior art. The wood is not fragmented or particulated, the wafers dry quickly and economically without additional energy, and they are all of the same shape and size, thus significantly simplifying automatic stokers and associated equipment.

Many other objectives and advantages of the invention may become manifest to those versed in the art. The usefullness of this invention is not confined to the particular manners described above. While the foregoing disclosure relates to the preferred embodiment of my invention, be it known that I claim all changes and modifications to which I am entitled.

What is claimed is:

1. A method of making compressed wood fuel pellets, comprising the steps of severing a wafer off of an elongate piece of wood against the grain of said wood, splitting out a portion along the grain of said wood, said portion remaining within said wafer, confining said portion of the wafer in a direction generally perpendicular to the grain of the wood, and compressing the confined portion along the grain of the wood.

2. A compressed wood fuel pellet split out of a severed wafer section of tree branch or trunk, characterized by contiguous wood fiber which closely proximates an original cross section across the grain, and which is compressed along the grain by at least 40% to a specific gravity of at least 1.2.

3. The method of claim 1, including the further step of compressing the confined portion to a length of at least 40% less than the thickness of the wafer.

4. The method of claim 1, characterized by the severed portion having a length dimension at least 1.5 times a cross section dimension.

5. The method of claim 1, including the further step of drying the wafer to a lower moisture content than the piece of wood.

6. The method of claim 1, characterized by the pellet having a specific gravity of at least 1.2.

7. The method of claim 1, including the further step of compressing at least one of the pellet grain ends into a generally convex shape.

8. The method of claim 1, in which the steps of severing, confining, and compressing are done in a single operation.

9. The method of claim 1, in which the severed portion and all fibers therein remain contiguous.

10. The method of claim 1, including the further step of confining the portion from both sides of the wafer.

11. The method of claim 1, including the further step of compressing the confined portion from both ends.

12. The fuel pellet of claim 2, further characterized by the pellet having a length along the grain which is in the range of 40 to 70% of the wafer thickness.

13. The method of claim 1, including varying the wafer thickness inversely proportional to the compressibility of the wood.

14. A machine for making compressed wood fuel pellets comprising a circumferential splitting edge for splitting a portion out of a wood wafer, an inward facing circumferential cage surface rearward of the splitting edge for confining the split portion in a direction generally perpendicular to the grain of the split portion, a compression hammer surface rearward of the cage surface and engageable against the confined end grain of the split portion, an anvil surface facing the hammer surface and engageable against an opposed end grain of the split portion, mechanism operatively connected to force the hammer surface and anvil surface together for compressing the split portion along the grain of the wood and within the cage surface, and wafer feed structure for feeding the entire wafer to the splitting edge.

15. The machine of claim 14, further characterized in that a portion of a plurality of splitting edges is hex cellular.

16. The machine of claim 14, characterized in that said splitting edge is radially outward of said cage surface.

17. The machine of claim 14, characterized in that said splitting edge, cage surface, and hammer are embodied in a rotatable wheel for compressing said wafer into a series of connected beads.

18. The machine of claim 17, further comprising a separator for separating said connected beads.

19. The fuel pellet of claim 2, further characterized by a variety of the pellets of different woods being of the same length along the grain, thickness of the wafer having been varied inversely proportional to the compressibility of the wood.

* * * * *